May 30, 1961 H. A. TOULMIN, JR 2,986,012
METHOD AND APPARATUS FOR PRODUCING STERILIZED
HEAT SENSITIVE MATERIALS
Filed July 25, 1955 3 Sheets-Sheet 2
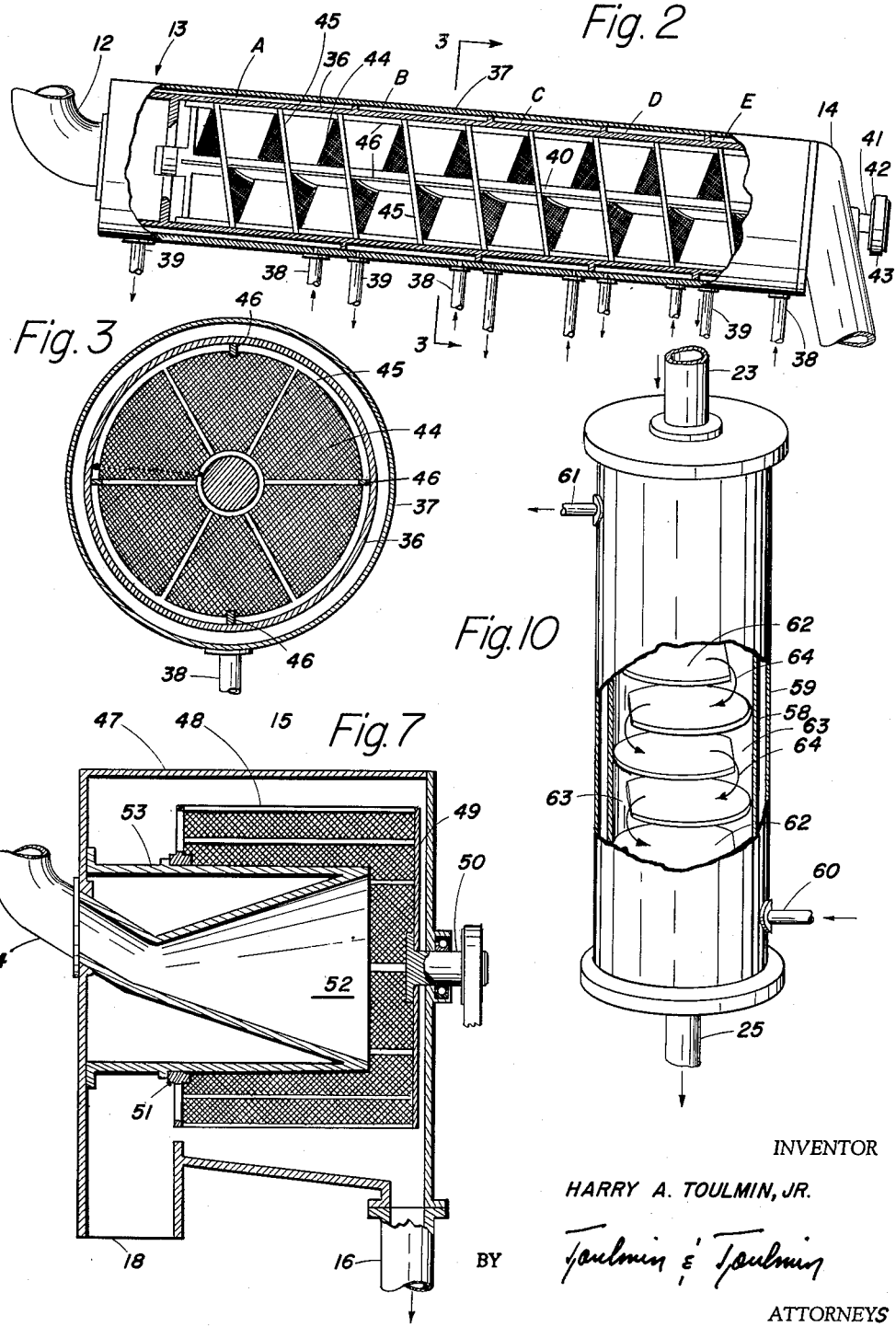
INVENTOR
HARRY A. TOULMIN, JR.
BY *Toulmin & Toulmin*
ATTORNEYS

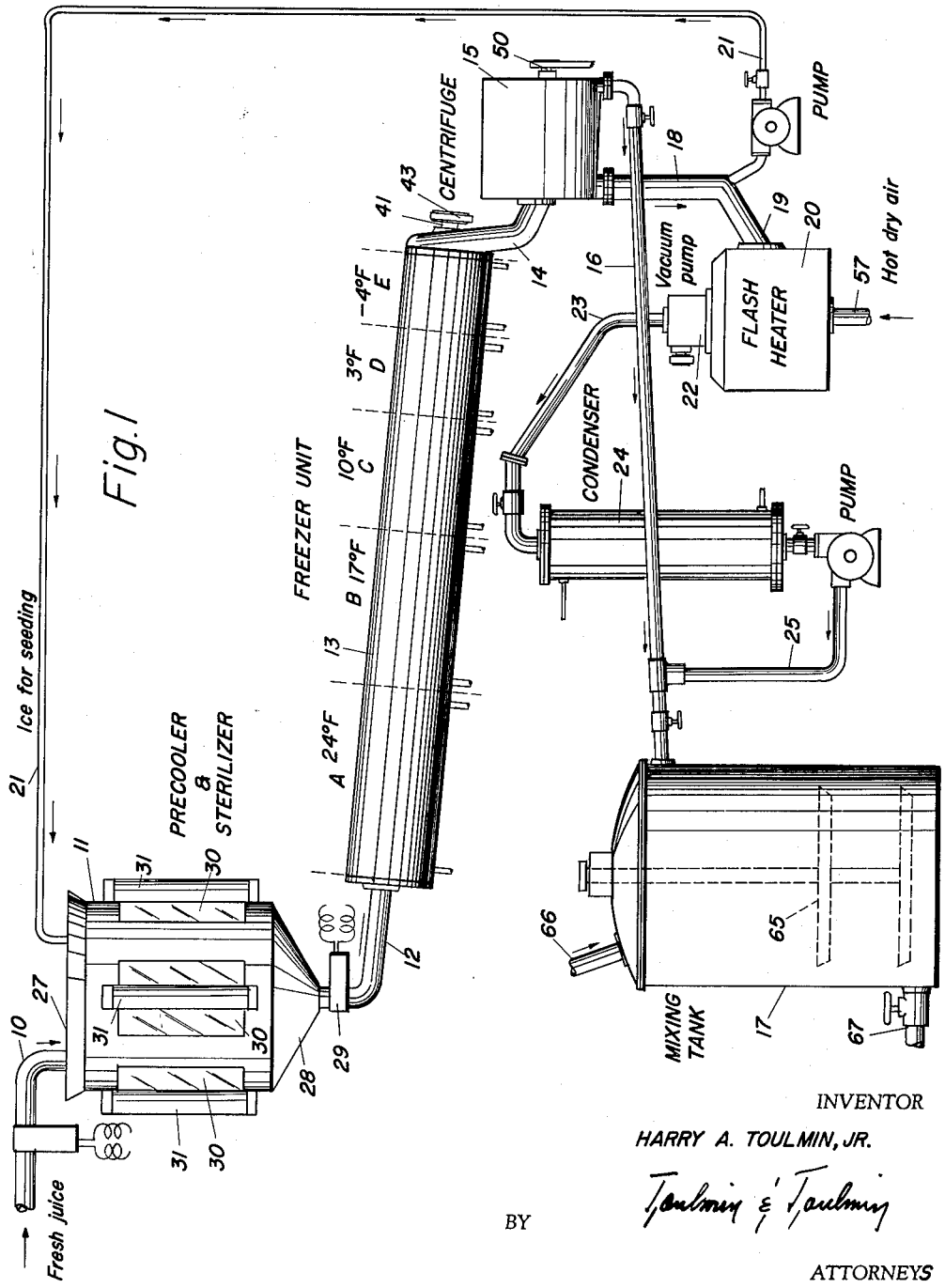

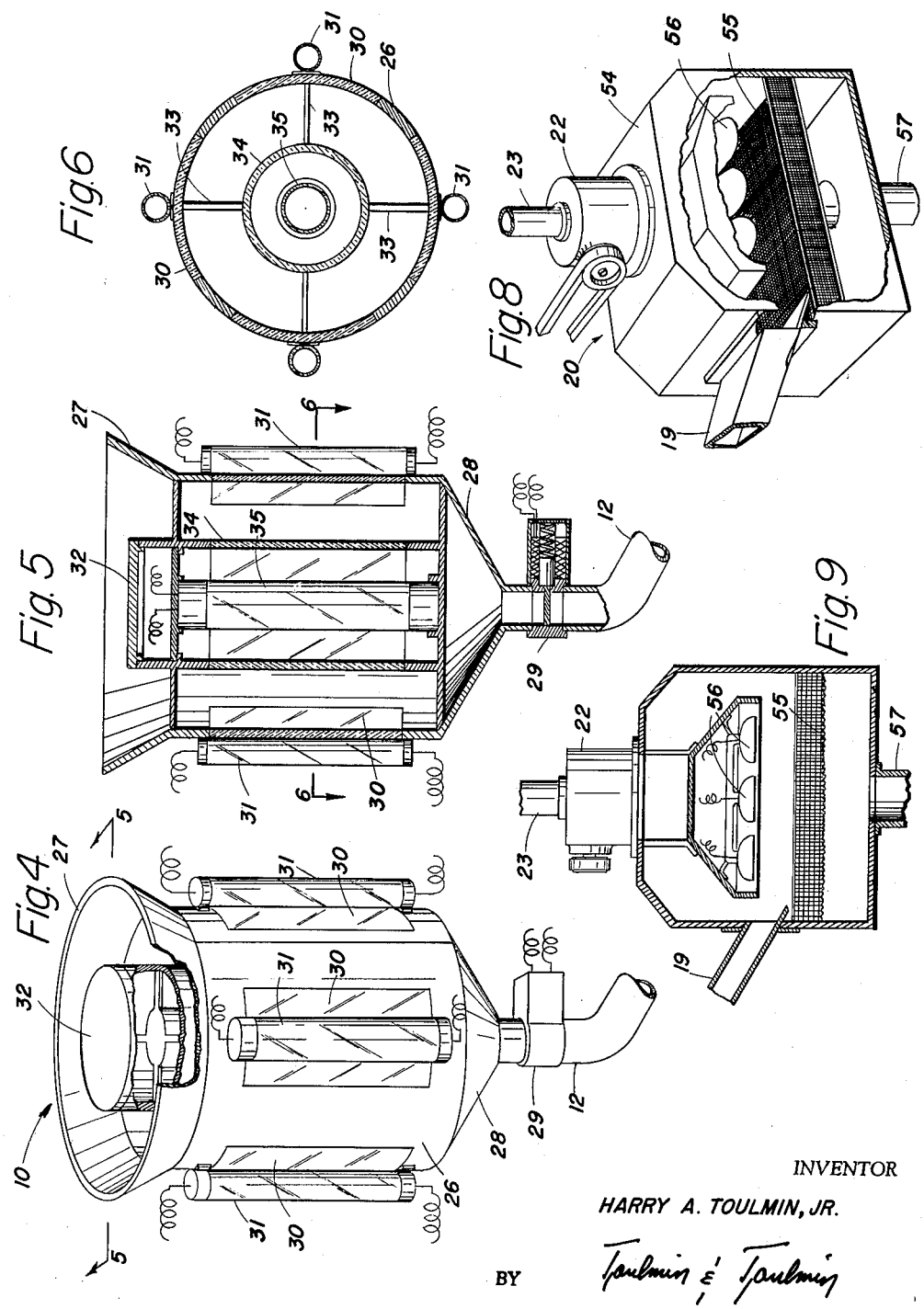

United States Patent Office 2,986,012
Patented May 30, 1961

2,986,012

METHOD AND APPARATUS FOR PRODUCING STERILIZED HEAT SENSITIVE MATERIALS

Harry A. Toulmin, Jr., Dayton, Ohio, assignor, by mesne assignments, to Union Carbide Corporation, New York, N.Y., a corporation of New York Filed July 25, 1955, Ser. No. 524,189

4 Claims. (Cl. 62—58)

The present invention relates to the concentration of heat-sensitive liquids, more particularly to an apparatus and method for the concentration of liquids containing solids by dehydration through a continuous freezing process.

Several processes have been devised for making various concentrates, particularly of fruit juices or the like. The citrus juice industry, particularly, has spent a considerable amount of time and money in developing a profitable process for the concentration of citrus juices. Of the several processes which have been devised and tested, the method of concentration by freezing presently gives the most promise.

In the concentration of citrus juices by freezing, the temperature of the juices is usually lowered in stages to remove the water therefrom in the form of ice crystals. After the juice has been cooled in one stage, it is recirculated and passed through the second stage which is maintained at a temperature lower than the temperature of the previous stage. When the juice has been passed through a plurality of stages, the temperature of the final stage is sufficiently low whereby the greatest portion of the water has been removed.

The dehydrated juice which emerges from the last freezing step may then be mixed with pulp of the fresh juice in order to attain the desired concentration of juice. In dehydrating a juice by stages, each stage represents a complete and separate freezing process. Consequently, there must be a recirculation of the batch of juice through each freezing stage. This involves the expenditure of time. In addition, the cost of the installation is increased since a plurality of freezing units must be maintained.

The additional expense of removing all of the water is usually not justified. In some instances it is desired to retain some water in the dehydrated juice concentrate.

The present invention provides an apparatus whereby a heat-sensitive liquid is dehydrated by a freezing process which is accomplished by flowing the liquid through a freezer unit wherein the temperature thereof is progressively decreased. The freezer unit has a plurallity of freezing zones therein, each of which is maintained at a lower temperature than the preceding zone. The temperatures of the freezing zones decrease at substantially equal decrements as the juice flows through the freezer unit.

When the dehydrated juice emerges from the freezer unit in the form of a slushy mass of juice and ice crystals, it is at a temperature which is substantially equal to that of the dehydrated juice after it has emerged from the last step of the conventional stage freeze concentration process. The slushy mass is then conveyed to a centrifuge and the separated juice concentrate is flowed to a storage tank. The surplus ice separated within the centrifuge is then passed through a flash heater and a condenser in order to liberate aromatics and other flavor producing particles which may be entrained in the ice crystals. The removed aromatics are then added to the concentrated juice.

It is, therefore, the principal object of this invention to provide an improved apparatus and method for the concentration of heat-sensitive liquids by freezing.

It is another object of this invention to provide an apparatus for the dehydration of juices whereby the desired concentration is obtained by passing the juice through a single freezer unit.

It is an additional object of this invention to provide a novel and improved apparatus for concentrating juices and the like by freezing.

It is a further object of this invention to provide an apparatus for the cooling and simultaneous sterilizing of the fresh juice prior to the concentration thereof.

It is still another object of this invention to provide an improved apparatus for the separation of water and solids from the surplus ice removed during the freezing of the juice.

It is a still further object of this invention to provide an improved apparatus for condensing aqueous vapors containing aromatics and solids.

It is still an additional object of this invention to provide an improved system for concentrating heat-sensitive liquids by freezing wherein the liquid is progressively passed through freezing zones in which the temperatures are progressively decreased in substantially equal decrements.

Other objects and advantages of this invention will become apparent upon reference to the accompanying description when taken in conjunction with the following drawings, wherein:

Figure 1 is a schematic view indicating the arrangement of the various components of this invention;

Figure 2 is a side elevational view of the freezer unit of this invention with a portion of the wall removed to show the details of the interior thereof;

Figure 3 is a sectional view taken along the line 3—3 of Figure 2;

Figure 4 is a perspective view of the pre-cooling and sterilizing apparatus of this invention;

Figure 5 is a sectional view taken along the line 5—5 in Figure 4;

Figure 6 is a top plan view of the pre-cooling and sterilizing apparatus of Figures 4 and 5;

Figure 7 is a vertical sectional view of the centrifuge apparatus of this invention;

Figure 8 is a perspective view of the flash heating device of this invention with a portion of the wall removed to show interior details;

Figure 9 is a sectional view taken along the lines 9—9 of Figure 8; and

Figure 10 is a side elevational view of the condenser of this invention with a portion of the wall thereof removed.

Returning now to Figure 1 wherein like reference symbols indicate the same parts throughout the various views, there is illustrated the arrangement of the various components which comprise the system of this invention.

The apparatus of this invention comprises a supply conduit 10 which delivers fresh juice to a precooler and sterilizer 11. The precooler 11 is connected by a conduit 12 to a freezer unit 13. The dehydrated juice emerges from the freezer unit through the discharge conduit 14 where it is conducted to a centrifuge 15. The concentrated juice separated within the centrifuge 15 passes through a pipe line 16 to a mixing tank 17. The ice separated within the centrifuge is passed through an ice discharge line 18 where a greater portion of the ice is diverted into a supply line 19 which leads to a flash heater 20. The remaining portion of the ice removed from the centrifuge 15 is passed through the pipe line 21 where it is dumped into the precooler in order to seed and precool the fresh juice therein.

The aqueous vapors and aromatics liberated from the ice within the flash heater 20 are withdrawn from the flash heater by means of a vacuum pump 22. These vapors then pass through a pipe line 23 where they are introduced into a condenser 24. The condensed juice is pumped through a pipe line 25 to the mixing tank 17 where it is intermixed with the concentrated juice removed from the centrifuge.

Each of the above-mentioned components will be separately described in detail.

The precooling device 11 comprises a cylindrical outer wall 26 which is normally disposed in a vertical position as illustrated in Figure 4. The upper end of the precooler is flared as indicated at 27 and the lower end is converging as at 28. The discharge conduit 12 connects with the converging lower end and delivers the sterilized juice from the precooler to the freezer unit 13. A solenoid operated valve 29 is mounted within the discharge conduit.

The outer wall of the precooler has a plurality of transparent portions 30 therein. Each of these transparent portions is of a material which will readily admit ultraviolet light. A source of ultra-violet light 31 is positioned adjacent the outer surface of each one of the transparent portions. Each ultra-violet light emits rays having a wave length of the order of 2900 Angstrom units and is of a type commercially available.

A hollow cylinder 32 is centrally mounted within the precooler by means of supporting arms 33. A circumferential section of the hollow cylinder, as indicated at 34, is transparent to admit ultra-violet light. A source of ultra-violet light 35 is also mounted within the hollow cylinder 32.

The freezer unit 13 comprises a cylindrical casing 36, which is normally disposed in an inclined position. The upper end of the cylindrical casing is connected to the conduit 12 and the lower end of the casing is connected to the discharge conduit 14.

The cylindrical casing 36 is jacketed by an outer wall 37 and the space between the cylindrical casing and the jacket is divided into a plurality of freezing chambers A through E. Each of the freezing chambers has an inlet 38 and an outlet 39 for the circulation of a refrigerant therein. The chambers are maintained at different temperatures with the temperatures being progressively lower as the juice flows downwardly through the freezing unit. The refrigerant which may be delivered from a suitable source is circulated through the chamber E first and then upwardly through each of the chambers E to A in inverse consecutive order. Separate sources of refrigerant for each chamber may also be employed. The temperatures of the freezing zones are as follows—

Zone:
A _____ 24° F.
B _____ 17° F.
C _____ 10° F.
D _____ 3° F.
E _____ −4° F.

Within the cylindrical casing 36 there is a rotatably mounted screw 40. The screw is suitably journalled at each end thereof and the lower end comprises a drive shaft 41 extending from the screw outwardly through the discharge end of the freezing unit. There is a pulley 42 mounted on the end of the driving shaft which is drivingly connected by a belt 43 to a suitable source of power.

The screw 40 comprises a plurality of blades 44 which are in the form of a continuous helix. The outer edge of the blade is formed by a helical rim 45. As may be seen in Figure 3, there are a plurality of radially extending braces to support the helical rim. Longitudinally extending scrapers 46 are mounted on the helical rim to engage the inner walls of the cylindrical casing 36.

The blades 44 are perforated and comprise a Monel steel mesh. Either the entire blade or a portion thereof may be perforated. In event the latter construction is employed, Monel mesh panels are inserted in each of the screw blades.

In operation the screw is rotated in a direction which results in the blades and the screw travelling upwardly with respect to the inclined freezing unit.

Proceeding now to Figure 7, there is illustrated therein the centrifuge 15 which comprises a substantially cylindrical outer casing 47 having its axis in a horizontal plane and within which is rotatably mounted a cage 48 having perforated walls. The cage has a closed end 49 from which extends a shaft 50 which is journalled in an end wall of the casing. The shaft 50 is connected by a belt to a source of power which rotates the cage. The other end of the cage is open and has a bearing ring 51 mounted therein.

Mounted within the casing is a funnel-shaped inlet 52 which is connected through a conduit 14 to the freezing unit 13. The inlet is surrounded by a cylindrical shield 53 extending from the other end of the casing 47. The cage bearing ring 51 is journalled upon the shield 53. The inner end of the inlet is disposed adjacent the closed end 49 of the rotating cage. This positioning of the inlet will result in the incoming slushy mass urging the surplus ice within the cage toward the open end of the cage and consequently to be dumped through the surplus ice discharge line 18.

The juice which is separated from the slushy mass through centrifugal force is forced through the perforated walls of the cage and is withdrawn through a juice conduit 16 to be conveyed to the mixing and storage tank 17.

A major portion of the surplus ice separated within the centrifuge is conveyed to the flash heater 20 as described above. The flash heater 20 comprises an enclosure 54 within which is mounted a substantially horizontal perforated platform 55. The ice from the centrifuge is delivered through the conduit 19 and discharged upon the perforated platform. A plurality of infra-red lights 56 are mounted above the perforated platform 55. A fast moving stream of hot dry air is admitted into the flash heater through the air conduit 57 and is drawn through the flash heater by the vacuum pump 22. The hot dry air used in the flash heater is sterilized before being admitted thereto.

The aqueous vapors and aromatics are then conveyed to the condenser 24 which comprises a normally vertically disposed cylinder 58 connected to the conduit 23 and having a jacket 59 thereon. Coolant is circulated within the space between the cylinder and the jacket through an inlet 60 and discharged through the outlet 61.

A plurality of baffles 62 are spaced throughout the entire length of the cylinder 58. These baffles extend completely across the cylinder 58, except for an open portion indicated at 63. This open portion forms a passage around that particular baffle. These open portions are staggered as shown in Figure 10 so that the path of the condensate through the condenser is a tortuous one as indicated by the arrows 64. By retarding the passage of the condensate through the condenser in this manner the aqueous vapors entering the condensate are all sufficiently condensed before they emerge through the discharge line 24 of the condenser.

The condensed vapors are then conveyed to the mixing tank 17 to be intermixed with the primary dehydrated juice removed from the centrifuge 15. The mixing tank 17 comprises conventional mixer means as indicated at 65 and also has means indicated at 66 for the addition of pulp to maintain the intermixed juice at a proper concentration. An outlet 67 is provided to withdraw the concentrated juice as desired.

With the above construction of each one of the components of the system of this invention in mind, a detailed description of the progress of the juice through the apparatus of this invention will be presented.

The fresh juice is admitted into the precooler tank 11, through the supply line 10. Simultaneously therewith surplus ice removed from the centrifuge 15 is also admitted into the precooler to seed the incoming juice. This seeding process results in precooling the juice to a temperature of 32°–33° F. There will be some formation of ice crystals within the precooler because of this seeding process. These ice crystals, however, will serve as nuclei for the larger crystals to be formed within the freezer unit.

As the fresh juice and ice crystals pass through the precooler they are subjected to the action of the ultraviolet light sources located outwardly of the precooler and within the hollow cylinder.

The sterilized juice and ice are then delivered into the freezer unit through the supply conduit 12. Immediately upon entering zone A of the freezer unit, ice crystals will begin to form in the juice. As the juice flows through the freezer unit, it will encounter progressively lower temperatures within the zones B through E since each one of these zones is maintained at predetermined temperatures as described previously. Ice formed within the freezer unit will be prevented from adhering to the walls of the unit due to the action of the scrapers 46 mounted on the rim of the screw 40. The screw 40 is rotated in a direction so as to urge the ice crystals formed within the freezing unit upwardly within the unit contra to the flow of the juice therethrough. The speed of the screw and the incline of the freezing unit are so selected that a major portion of the ice crystals will gravitate through the continuous helical path formed between the blades of the screw. These ice crystals together with the primary dehydrated juice will be discharged through the discharge conduit 14 of the freezer unit.

The speed of the screw is selected so as to result in a mass of ice crystals being presented to the juice supplied to the freezing unit. As this incoming juice is at a higher temperature than the ice crystals in zone A, this ice will be constantly melted and subsequently the ice will never be urged into the supply conduit 12. Subsequently the juice at progressively lower temperatures will both pass through the perforated blades of the screw and through the continuous helical path of the screw to emerge with the ice removed therefrom in the form of a slushy mass.

The rotation of the screw and a layer of ice crystals adjoining the upper faces of the blades will also agitate the juice to prevent the formation of white ice. The white ice results from the entrainment of air within the ice crystals. The agitation also insures the formation of fine ice crystals of virtually pure water which are readily separated from the dehydrated juice as will be later described.

As the temperature of zone E is maintained at approximately −4° F., it can be seen that the major portion of the water in the juice will be removed in the form of ice.

The slushy mass will be conveyed through the conduit 14 into the centrifuge 15. The rotating action of the perforated cage will result in the juice being separated from the ice. The juice will be conveyed through the conduit 16. The surplus ice within the rotating cage will be urged outwardly through the open end of the cage by the action of the incoming slushy mass of primary dehydrated juice and ice. The surplus ice will drop through the ice conduit 19 where a portion thereof will be diverted to the precooler in a manner as previously described. The remaining portion of the ice will be delivered to the flash heater 20 to remove aromatics which may be entrained within the ice crystals.

As the surplus ice is delivered upon the perforated platform 55, it is immediately subjected to heat from the infra-red lights 56 and from contact with the stream of hot dry air rapidly moving upwardly through the flash heater. Meanwhile, pulp and other solids removed from the ice crystals remain upon the platform 55 from which they are periodically removed by suitable means and delivered into the mixing tank to maintain the juice therein at a proper concentration.

The aqueous vapors and entrained aromatics are passed through the condenser 24 and the resultant condensed juice is then delivered to the mixing tank to be intermixed with the primary dehydrated juice removed from the centrifuge 15.

The juice passes through progressively lower zones of temperature wherein zone B is at 17° F., zone C at 10° F., zone D at 3° F., and zone E at −4° F. It is the combined action of the progressively lower temperatures encountered throughout the freezing unit and a mass of ice crystals urged counter to the flow of juice which enables a major portion of the water to be removed from the juice through freezing.

The upward movement of the ice crystals throughout the freezer unit also retards the flow of juice through the freezer unit to enable the greatest possible amount of water to be removed from the juice, through the action of each freezing zone. Therefore, it is only necessary to pass the juice through the freezer unit once. The single continuous freezing encountered throughout the freezer unit of this invention will result in a dehydrated juice of a concentration substantially equal to, and in most cases, greater than the concentration of juice produced through a multi-stage freezing process.

The continuous single freezing process as employed in this invention also results in greater economies and efficiency in operation since there is no necessity for recirculating the juice through the freezing stage once it has been dehydrated. Consequently, a considerable amount of piping and control mechanism is also eliminated.

Thus it can be seen that the counterflow juice concentration apparatus of this invention represents a considerable advance in the art of concentrating juices and the like through freezing. The time involved in completely dehydrating a batch of fresh juice is considerably reduced since there is no elapse of time between subjecting the juice to progressively lower temperatures as would be the case if it were necessary to recirculate the batch of juice as conventionally done in the multistage freezing process. The apparatus is simple in arrangement and the combined functions of each unit as described above result in a concentrated juice achieved with a minimum of equipment.

It will be understood that this invention is susceptible to modification in order to adapt it to different usages and conditions, and, accordingly, it is desired to comprehend such modifications within this invention as may fall within the scope of the appended claims.

What is claimed is:

1. An apparatus for low temperature dehydration of aqueous liquids containing solids and comprising a single inclined tubular structure having a plurality of freezing zones for lowering the temperature in stages of aqueous liquid flowing downwardly through said tubular structure to remove the water therefrom in the form of ice crystals, means within said tubular structure for flowing the ice crystals contra to the flow of liquid therethrough upwardly from the lower end of the tubular structure, said ice crystals being moved along in the presence of the freezing liquid to additionally decrease the temperature of the liquid to form more ice crystals, means comprising a centrifuge connected to said tubular structure for separating the dehydrated liquid from the ice crystals by centrifuging continuously so as to maintain a substantially uniform amount of ice crystals within the tubular structure as the ice crystals are formed and discarded, and means comprising a flash heater and condenser connected to said centrifuge to flash heat ice crystals delivered therefrom.

2. An apparatus for low temperature dehydration as claimed in claim 1 and further comprising means for pretreating the liquid, and means comprising a mixing tank connected to said condenser for receiving condensed vapors therefrom and mixing the same with freeze dehydrated juice from said centrifuge.

3. In the method of concentrating liquids containing solids by freezing, the steps of continuously flowing the liquid along a flow path in a downward direction through freezing zones, subjecting the flowing liquid to progressively decreasing temperatures in the several zones to remove water therefrom in the form of ice crystals, moving the ice crystals contra to the flow of liquid and in the presence thereof at such a speed that the incoming liquid will melt the ice in the high temperature end of the flow path and none of the ice will be discharged from the high temperature end of the flow path but both liquid and ice crystals will emerge from the low temperature end of the flow path separating the dehydrated liquid and ice crystals emerging from the low temperature end of the flow path, and flash heating said ice crystals and condensing volatile matter and admixing the same with concentrated liquid.

4. In the method of concentrating liquids containing solids, the steps of initially pre-cooling all the liquid to a temperature of about 32° F., continuously flowing the pre-cooled liquid along a flow path including contiguous freezing zones, subjecting the flowing liquid to temperatures progressively decreasing from 24° F., to −4° F. in said zones to remove water from the liquid in the form of ice crystals, moving the ice crystals contra to the flow of liquid and in the presence thereof at such a speed that the pre-cooled incoming liquid will melt the ice crystals in the high temperature end of the flow path and whereby none of the ice crystals will be discharged from the high temperature end of the flow path but both liquid and ice crystals will emerge from the low temperature end of the flow path, separating the dehydrated liquid and ice crystals emerging from the low temperature end of the flow path, and flash heating and condensing volatile matter from said ice crystals.

References Cited in the file of this patent

UNITED STATES PATENTS

| | | |
|---|---|---|
| 1,641,429 | Heyman et al. | Sept. 6, 1927 |
| 1,746,185 | Bernat | Feb. 4, 1930 |
| 2,015,490 | McAllister | Sept. 24, 1935 |
| 2,131,333 | Von Schweinitz | Sept. 27, 1938 |
| 2,317,777 | Krause | Apr. 27, 1943 |
| 2,424,663 | Mantle | July 29, 1947 |
| 2,436,218 | Malcolm | Feb. 17, 1948 |
| 2,537,774 | Machinist | Jan. 9, 1951 |
| 2,552,524 | Cunningham | May 15, 1951 |
| 2,578,673 | Cushman | Dec. 18, 1951 |
| 2,617,273 | Findlay | Nov. 11, 1952 |
| 2,617,274 | Schmidt | Nov. 11, 1952 |
| 2,647,059 | Wenzelberger | July 28, 1953 |
| 2,723,539 | Wenzelberger | Nov. 15, 1955 |
| 2,815,288 | McKay | Dec. 3, 1957 |